United States Patent
Watanabe

(10) Patent No.: US 10,073,533 B2
(45) Date of Patent: Sep. 11, 2018

(54) OPERATION APPARATUS FOR VEHICLE

(71) Applicant: TOYOTA JIDOSHA KABUSHIKI KAISHA, Toyota-shi, Aichi (JP)

(72) Inventor: Masaya Watanabe, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/320,247

(22) PCT Filed: May 25, 2015

(86) PCT No.: PCT/JP2015/064932
§ 371 (c)(1),
(2) Date: Dec. 19, 2016

(87) PCT Pub. No.: WO2015/198769
PCT Pub. Date: Dec. 30, 2015

(65) Prior Publication Data
US 2017/0147080 A1  May 25, 2017

(30) Foreign Application Priority Data

Jun. 23, 2014 (JP) ................................. 2014-128580

(51) Int. Cl.
*G06F 3/01* (2006.01)
*B60K 35/00* (2006.01)

(52) U.S. Cl.
CPC .............. *G06F 3/017* (2013.01); *B60K 35/00* (2013.01); *B60K 2350/104* (2013.01);
(Continued)

(58) Field of Classification Search
None
See application file for complete search history.

(56) References Cited

U.S. PATENT DOCUMENTS 9,342,797 B2 * 5/2016 El Dokor ............. G06N 99/005
2007/0244613 A1 10/2007 Ishikawa et al.
(Continued)

FOREIGN PATENT DOCUMENTS

CN       103092402 A    5/2013
JP       2004-061252 A   2/2004
(Continued)

*Primary Examiner* — Kenneth B Lee, Jr.
(74) *Attorney, Agent, or Firm* — Hunton Andrews Kurth LLP

(57) ABSTRACT

An operation apparatus for a vehicle includes a detector configured to detect a motion of a hand; a display apparatus configured to output an operation screen; and a processing device configured to perform, based on the motion of the hand detected by the detector, selection and determination processes for selecting and determining one of selection target items in the operation screen output on the display apparatus. The processing device is configured to form, in a vehicle stop state, a first operation screen related to a predetermined function, the first operation screen being operable based on the motion of the hand, and form, in a vehicle travel state, a second operation screen related to the predetermined function, the second operation screen being different from the first operation screen and operable based on the motion of the hand easier than that in the vehicle stop state.

1 Claim, 4 Drawing Sheets

(52) U.S. Cl.
CPC *B60K 2350/106* (2013.01); *B60K 2350/1044* (2013.01); *B60K 2350/1052* (2013.01); *B60K 2350/2095* (2013.01)

(56) References Cited

U.S. PATENT DOCUMENTS

| | | |
|---|---|---|
| 2013/0106693 A1 | 5/2013 | Okuyama et al. |
| 2014/0111454 A1 | 4/2014 | Hosoi et al. |

FOREIGN PATENT DOCUMENTS

| | | | | |
|---|---|---|---|---|
| JP | 2007-145106 A | | 6/2007 | |
| JP | 2007-302223 A | | 11/2007 | |
| JP | 2009-184551 A | | 8/2009 | |
| JP | 2009184551 A | * | 8/2009 | ........ H04M 1/72527 |
| JP | 2010-157252 A | | 7/2010 | |
| JP | 2012096670 A | | 5/2012 | |
| JP | 2012-253736 A | | 12/2012 | |
| JP | 2012253736 A | * | 12/2012 | ........ H04M 1/72527 |
| JP | 2013178783 A | | 9/2013 | |

\* cited by examiner

OPERATION APPARATUS FOR VEHICLE

CROSS-REFERENCE TO RELATED APPLICATIONS

This is a national phase application based on the PCT International Patent Application No. PCT/JP2015/064932 filed May 25, 2015, claiming priority to Japanese Patent Application No. 2014-128580filed Jun. 23, 2014, the entire contents of both of which are incorporated herein by reference.

TECHNICAL FIELD

The disclosure is related to an operation apparatus for a vehicle.

BACKGROUND ART

Such an input method is known (see Patent Document 1, for example) in which only a simple hand motion input that does not involve gazing a screen is performed for a driver, while operations that involve gazing at buttons, a touch panel, etc., are permitted for passengers other than the driver.

CITATION LIST

Patent Document 1 Japanese Laid-open Patent Publication No. 2007-302223

SUMMARY

Technical Problem

However, according to a configuration disclosed in Patent Document 1, the same screen is formed for a vehicle travel state and a vehicle stop state, which may cause reduced operability.

It is an object of the present disclosure to provide an operation apparatus for a vehicle which can form operation screens that are different between in a vehicle travel state and in a vehicle stop state and operable based on a motion of a hand.

Solution to Problem

According to an aspect of the disclosure, an operation apparatus for a vehicle is provided, and the operation apparatus includes:

a detector configured to detect a motion of a hand;

a display apparatus configure to output an operation screen; and a processing device configured to perform, based on the motion of the hand detected by the detector, selection and determination processes for selecting and determining one of selection target items in the operation screen output on the display apparatus, wherein the processing device is configured to form, in a vehicle stop state, a first operation screen related to a predetermined function, the first operation screen being operable based on the motion of the hand, and form, in a vehicle travel state, a second operation screen related to the predetermined function, the second operation screen being different from the first operation screen and operable based on the motion of the hand easier than that in the vehicle stop state.

Advantageous Effects of Invention

According to the present disclosure, an operation apparatus for a vehicle can be obtained which can form operation screens that are different between in a vehicle travel state and in a vehicle stop state and operable based on a motion of a hand.

DESCRIPTION OF EMBODIMENTS

In the following, embodiments are described in detail with reference to appended drawings.

Figure 1:
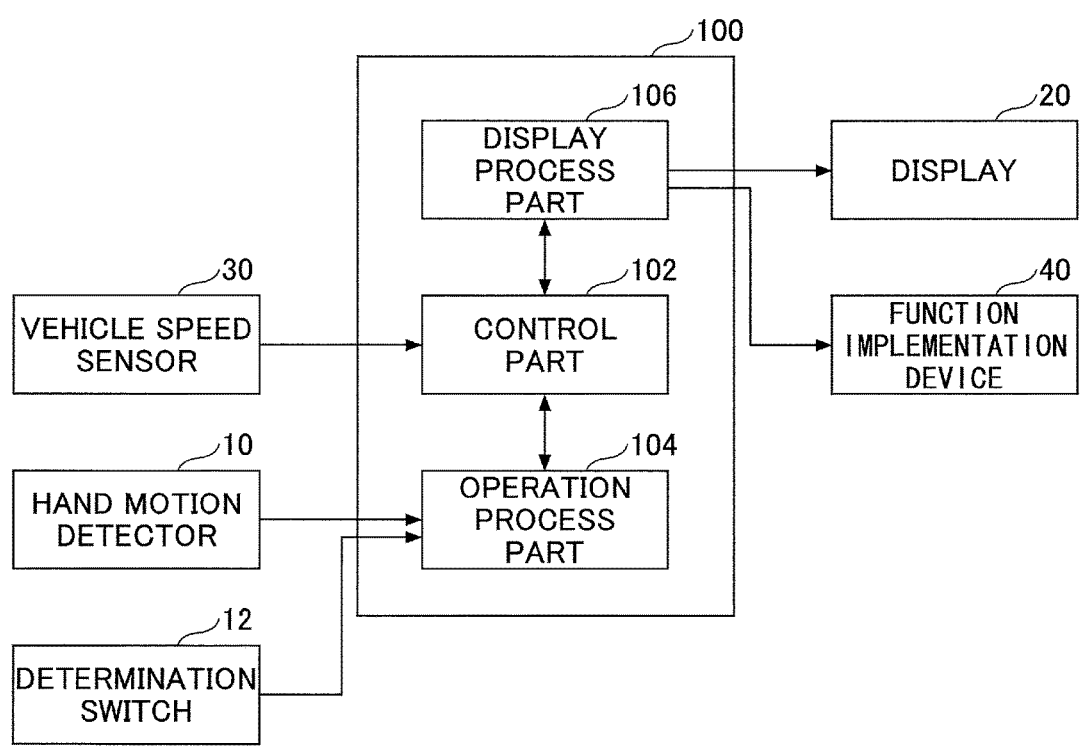
FIG. 1 is a diagram schematically illustrating a configuration of an operation apparatus for a vehicle 1 according to an embodiment.
Figure 2:
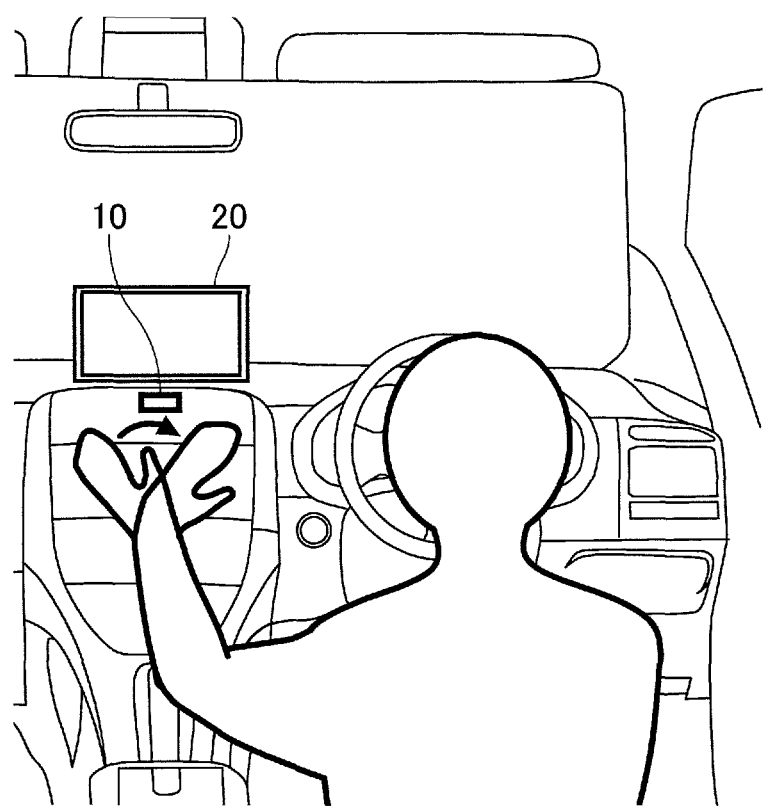
FIG. 2 is a diagram schematically illustrating an example of a mounting state of a hand motion detector 10 and a display apparatus 20.

FIG. 1 is a diagram schematically illustrating a configuration of an operation apparatus for a vehicle 1 according to an embodiment. FIG. 2 is a diagram schematically illustrating an example of a mounting state of a hand motion detector 10 and a display apparatus 20. It is noted that, in FIG. 2, a hand motion operation state of a driver is schematically illustrated.

The illumination apparatus 1 for a vehicle includes a hand motion detector 10, a determination switch 12, a display apparatus 20, a vehicle speed sensor 30, and a processing device 100.

The hand motion detector 10 detects a motion of a hand of a human. The hand motion detector 10 may be placed at an appropriate location in the vehicle (in an instrument panel, for example). For example, the hand motion detector 10 may be provided in the instrument panel, an arm rest in a center console or the like, as illustrated in FIG. 2. A way of detecting the motion of the hand of the human is arbitrary, and an optical detection method may be used. For example, the hand motion detector 10 may use two or more distance sensors to detect a position and a motion of the hand. The hand motion detector 10 may use an image sensor to detect the motion of the hand. The way of detecting the motion of the hand may be such a way disclosed in Japanese Laid-open Patent Publication No. 2007-302223, for example.

The determination switch 12 may be a mechanical switch or a touch switch. The determination switch 12 may be displaced with a speech input, etc. The determination switch 12 may be provided in the arm rest in the center console or the like, for example.

The display apparatus 20 may be an arbitrary display device such as a liquid crystal display and a HUD (Head-Up Display). The display apparatus 20 may be placed at an appropriate location in the vehicle (in an instrument panel, for example). The display apparatus 20 may be of a touch panel type, although a type for which the touch operation cannot be performed is suitable.

The vehicle speed sensor 30 outputs an electric signal according to rotational speed of vehicle wheels (vehicle speed pulses) to the control ECU 40.

The processing device 100 may be implemented by an ECU (Electronic Control Unit). The ECU may include a microprocessor that includes a CPU, a ROM, a RAM, etc., (not shown) which are interconnected via appropriate buses. The processing device 100 includes a control part 102, an operation process part 104, and a display process part 106. The parts 102, 104, and 106 may be implemented by the CPU executing programs stored in a storage device such as ROM. The parts 102, 104, and 106 are imaginary, and a program for implementing a certain part may be partially or totally incorporated in a different part. Further, the parts 102, 104, and 106 are not necessarily incorporated in the same ECU and thus may be implemented by several ECUs in cooperation.

The control part 102 controls a display of the display apparatus 20 in cooperation with the operation process part 104 and the display process part 106. Further, the control part 102 controls function implementation devices 40 in cooperation with the operation process part 104 and the display process part 106. The function implementation devices 40 are arbitrary, but may include an audio apparatus, a TV, a navigation apparatus, an air conditioner, etc., for example.

The operation process part 104 processes inputs from the hand motion detector 10. The operation process part 104 detects hand motion operations based on the input from the hand motion detector 10. The hand motion operations may be operations with the hand as a whole moving in left and right directions, operations with the hand as a whole moving in up and down directions, an operation with a finger pointing in an arbitrary particular direction, etc. It is noted that the hand motion operations to be detected by the operation process part 104 may change according to differences between operation screens on the display apparatus 20. In other words, the hand motion operations allocated to first operation screen and second operation screens, respectively, may differ. Further, the operation process part 104 processes an input from the determination switch 12. The operation process part 104 determines, based on the input from the determination switch 12, the presence or absence of the determination operation.

The display process part 106 controls the display of the display apparatus 20 in synchronization with the hand motion operations and in cooperation with the control part 102 to assist the hand motion operations. Specifically, the display process part 106 displays the operation screen on the display apparatus 20, and performs selection and determination processes for selecting and determining one of selection target items, etc. The determination process for the selected selection target item is implementing the function related to the selected selection target item, and includes a screen transition process, a text output process, a process of outputting an instruction (control signal) to the function implementation devices 40, etc., for example.

The selection target items form imaginary operation buttons (which means that the selection target items are not buttons of a mechanical type that are directly operated by hand). The selection target items (operation buttons) may be related to any types (functions). In other words, the functions (i.e., the selection target items) executable by the hand motion operations are arbitrary. For example, the selection target items may be to be operated for requesting (calling) a screen for various settings for a navigation apparatus or a map screen (including a display of the current position, for example) to be displayed on the display 20. Further, the selection target items may be operated for various settings for an air conditioner, or for requesting its operation screen to be displayed on the display 20. Further, the selection target items may be operated for various settings (a volume adjustment, etc.) for an audio apparatus or a TV, or for requesting its operation screen to be displayed on the display 20. Further, the selection target items may include selection target items (icons, launchers, widgets, etc.) for starting up any application. Further, the selection target items may include text input buttons in the operation screen such as an operation screen for inputting the Japanese syllabary, etc.

The display process part 106 changes the operation screen of the display apparatus 20 in cooperation with the control part 102 according to a vehicle travel state or a vehicle stop state. Specifically, in the vehicle stop state, the control part 102 provides the display process part 106 with an instruction to form the first operation screen. The first operation screen is such that relatively complex operations with the hand motion operations are possible. In the vehicle travel state, the control part 102 provides the display process part 106 with an instruction to form the second operation screen. The second operation screen is such that only relatively easy operations with the hand motion operations are possible. The first operation screen and the second operation screen are related to the same function (i.e., of the same type), and may be prepared on a function basis. For example, the first operation screen and the second operation screen are prepared as an operation screen related to the air conditioner, for example, respectively. The operation screens related to the same function may be operation screens related to the same function implementation device 40, operation screens related to the same setting of the same function implementation device 40, operation screens (top layer operation screens) for selecting (calling) one of the function implementation devices 40 to be operated, etc., for example.

Figure 3:
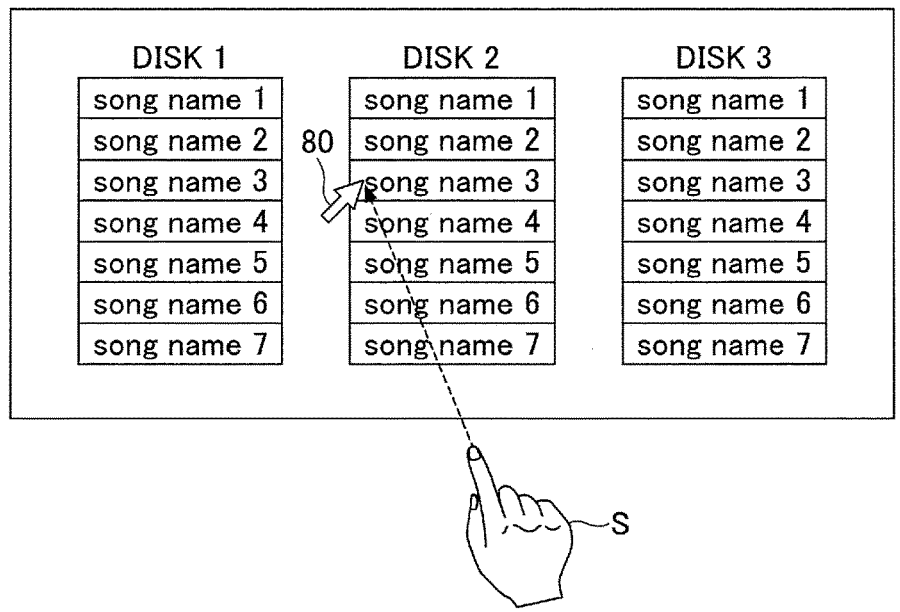
FIG. 3 is a diagram illustrating an example of a first operation screen.

FIG. 3 is a diagram illustrating an example of the first operation screen. In FIG. 3, a hand S at the hand motion operation is schematically illustrated.

The first operation screen illustrated in FIG. 3 is used for selecting a musical composition to be played on the audio apparatus. The first operation screen illustrated in FIG. 3 includes the selection target items related to 7 musical compositions in three disks (CDs, MDs, etc.), respectively. In this case, a user has 21 options for the selection target item by moving a pointer 80 on this first operation screen.

The display process part 106 displays the pointer 80 on the first operation screen. The display process part 106 changes the displayed position of the pointer 80 according to a finger pointing direction detected by the operation process part 104. For example, the control part 102 calculates, based on the finger pointing direction and the position of the finger detected by the operation process part 104, corresponding coordinates on the display apparatus 20. In other words, the control part 102 calculates the corresponding coordinates of the operation screen on the display apparatus 20 at an intersection with an extended line of the finger pointing direction. The display process part 106 renders the pointer 80 at the coordinates calculated by the control part 102. When the user changes the finger pointing direction, the control part 102 calculates the corresponding coordinates on the display apparatus 20 based on the changed finger pointing direction and the changed position of the finger. The display process part 106 renders (moves) the pointer 80 at the coordinates calculated by the control part 102. It is noted that when the user presses the determination switch 12 while the pointer 80 is on his/her desired selection target item, the control part 102 implements the function related to the selection target item having the pointer 80 thereon. As a result of this, in the example illustrated in FIG. 3, the user can select and play the musical composition "Song name 3" in the disk 2, for example.

It is noted that, in the example illustrated in FIG. 3, although the pointer 80 is illustrated as an example, a cursor may be used instead of the pointer 80. The cursor represents the selection target item itself that is currently displayed in a selected state. Thus, the position of the cursor corresponds to the position of the selection target item displayed in the selected state. It is noted that, in an initial state of the first operation screen, any one of the selection target items may be displayed in the selected state as a default, or none may be displayed in the selected state. It is noted that a way of implementing the selected state (i.e., the image of the cursor) may be arbitrary as long as the operator can recognize that the selection target item displayed in the selected state is selected. For example, the selected state may be implemented by making a luminance, a color, etc., of the selection target item to be displayed in the selected state different from that of other selection target items, or featuring a boundary of the selection target item to be displayed in the selected state with respect to that of other selection target items.

Figure 4:
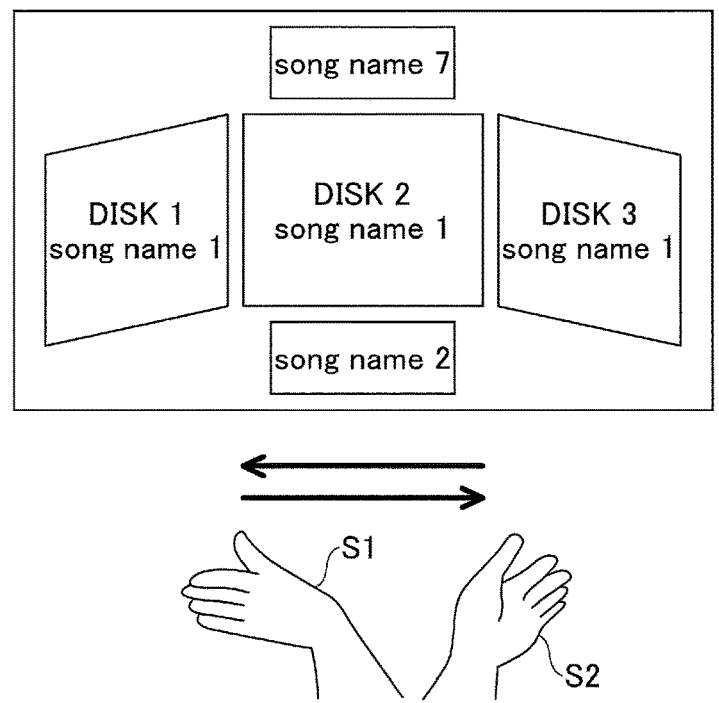
FIG. 4 is a diagram illustrating an example of a second operation screen.

FIG. 4 is a diagram illustrating an example of the second operation screen. In FIG. 4, hands S1 and S2 at the hand motion operation are schematically illustrated.

The display process part 106 renders the selection target item, which is currently being executed, at a specific location (a center in the example illustrated in FIG. 4) on the second operation screen. In the following, the selection target item rendered at the specific location (a center in the example illustrated in FIG. 4) on the second operation screen is referred to as "an execution selection target item". In the example illustrated in FIG. 4, the selection target item "Song name 1" in the disk 2 is the execution selection target item, and thus the second operation screen represents a state in which the musical composition "Song name 1" in the disk 2 is being selected and played. The display process part 106 does not display the pointer 80 on the second operation screen.

The display process part 106 changes, based on the direction of the hand motion operation detected by the operation process part 104, the execution selection target item and implements the function according to the execution selection target item. At that time, the determination operation with the determination switch 12 by the user is not necessary. Specifically, in the displayed state of the second operation screen, the display process part 106 simultaneously implements the selection and determination processes upon the hand motion operation. In the example illustrated in FIG. 4, the selection target items related to "Song name 7" and "Song name 2" in the disk 2 are rendered on the upper side and the lower side of the execution selection target item ("Song name 1" in the disk 2), respectively. When the hand motion operation (i.e., the action with the hand as a whole) in the up or down direction is detected by the operation process part 104, the control part 102 changes the selection target item in the up or down direction one by one to change the execution selection target item, and implements the function according to the changed execution selection target item. For example, when the user performs the hand motion operation in the up direction, "Song name 2" in the disk 2 becomes the execution selection target item to be played. Similarly, in the example illustrated in FIG. 4, the selection target items related to "Song name 1" in the disk 1 and "Song name 1" in the disk 3 are rendered on the left side and the right side of the execution selection target item ("Song name 1" in the disk 2), respectively. When the hand motion operation (i.e., the action with the hand as a whole) in the left or right direction is detected by the operation process part 104, the control part 102 changes the selection target item in the left or right direction one by one to change the execution selection target item, and implements the function according to the changed execution selection target item. In other words, the change between the disks is implemented. For example, when the user performs the hand motion operation in the left direction, "Song name 1" in the disk 3 becomes the execution selection target item to be played, as S1 illustrated in FIG. 4. Further, when the user performs the hand motion operation in the right direction, "Song name 1" in the disk 1 becomes the execution selection target item to be played, as S2 illustrated in FIG. 4. In this way, in the example illustrated in FIG. 4, the user has 4 options for the selection target item that can be changed with the hand motion operations on this second operation screen. However, by performing the hand motion operations a plurality of times, it becomes possible for the user to play the desired musical composition.

In this way, the second operation screen enables only the operations with the hand motion operations that are easier than those with respect to the first operation screen. Thus, even in the vehicle travel state, the operability with the hand motion operations can be increased without substantially interfering with the driver' concentration on the driving. It is noted that, in the example illustrated in FIG. 3 and FIG. 4, the first and second operation screens are illustrated as an example of operation screens related to the play function of the audio apparatus; however, other functions can also be implemented similarly. However, there may be such a function, such as a Japanese syllabary input function, etc., for which the second operation screen is not formed (i.e., the function that is implemented by only the first operation screen).

Figure 5:
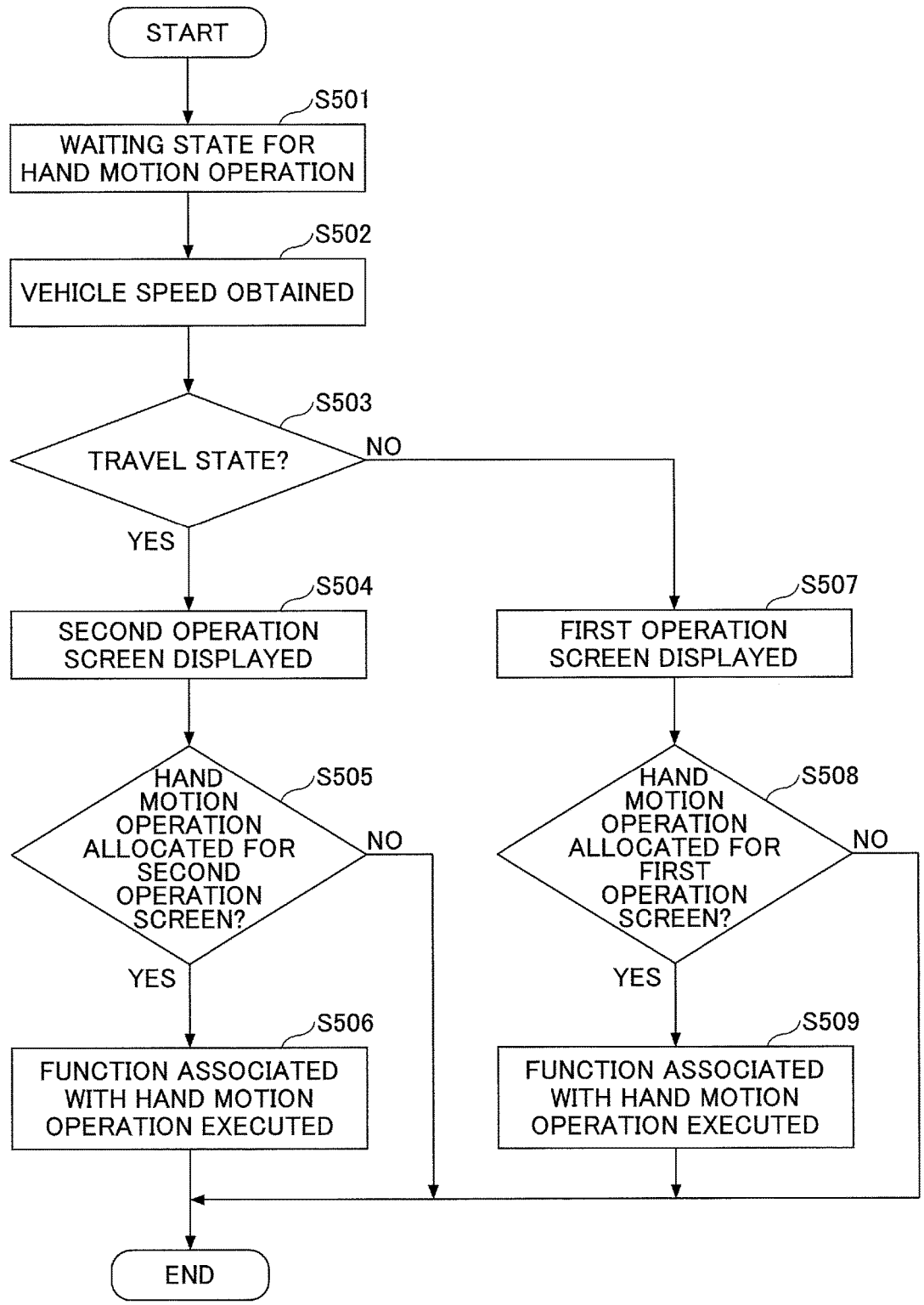
FIG. 5 is an example of a flowchart of a process executed by a processing device 100.

FIG. 5 is an example of a flowchart of a process executed by the processing device 100. The process illustrated in FIG. 5 is implemented during a period in which the operation screen related to the function for which the first and second operation screens are prepared is being output.

In step S501, the processing device 100 waits for the detection of the hand motion operation based on the detection result from the hand motion detector 10. When the processing device 100 detects the hand motion operation, the process goes to step S502.

In step S502, the processing device 100 obtains vehicle speed information from the vehicle speed sensor 30. It is noted that the vehicle speed information may be obtained based on the change in the own vehicle position from a GPS receiver, rotation speed of an output shaft of a transmission, etc.

In step S503, the processing device 100 determines, based on the vehicle speed information, whether the vehicle is traveling. If it is determined that the vehicle is traveling (i.e., in the vehicle travel state), the process goes to step S504, otherwise (i.e., in the vehicle stop state) the process goes to step S507. In step S503, the processing device 100 determines, based on the vehicle speed information, whether the vehicle is in the stop state. In this case, the processing device 100 may determines that the vehicle is in the stop state when the vehicle speed is 0 and a brake operation is being performed.

In step S504, the processing device 100 displays the second operation screen. The second operation screen is as described above.

In step S505, the processing device 100 determines whether the hand motion operation detected in step S501 described above corresponds to one of predetermined hand motion operations allocated to the second operation screen that is being displayed. The predetermined hand motion operations allocated to the second operation screen may be the hand motion operations with the hand as a whole in the left and right directions and/or the up and down directions (see FIG. 4). If it is determined that the hand motion operation corresponds to one of the predetermined hand motion operations allocated to the second operation screen, the process goes to step S506, otherwise the process for the hand motion operation detected at this time directly ends (i.e., the process ends without any special process for the hand motion operation detected at this time).

In step S506, the processing device 100 executes the function corresponding to the hand motion operation detected in step S501 described above (refers to the explanation with respect to FIG. 4, for example).

In step S507, the processing device 100 displays the first operation screen. The first operation screen is as described above.

In step S508, the processing device 100 determines whether the hand motion operation detected in step S501 described above corresponds to one of predetermined hand motion operations allocated to the first operation screen that is being displayed. The predetermined hand motion operations allocated to the first operation screen may be the operations with the finger pointing in the particular directions (see FIG. 3). If it is determined that the hand motion operation corresponds to one of the predetermined hand motion operations allocated to the first operation screen, the process goes to step S509, otherwise the process for the hand motion operation detected at this time directly ends (i.e., the process ends without any special process for the hand motion operation detected at this time).

In step S509, the processing device 100 executes the function corresponding to the hand motion operation detected in step S501 described above (refers to the explanation with respect to FIG. 3, for example).

According to the process illustrated in FIG. 5, the second operation screen can be output in the vehicle travel state, while the first operation screen can be output in the vehicle stop state. The second operation screen is related to the same function as the first operation screen, as described above, but the second operation screen is different from the first operation screen and a dedicated operation screen for accepting the hand motion operations easier than those to be accepted in the first operation screen. Thus, even in the vehicle travel state, the operability with the hand motion operations can be increased without substantially interfering with the driver' concentration on the driving.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention. Further, all or part of the components of the embodiments described above can be combined.

The invention claimed is:

1. An operation apparatus for a vehicle, the operation apparatus comprising:
    a detector configured to detect a motion of a hand;
    a display apparatus configure to output an operation screen; and
    a processing device configured to perform, based on the motion of the hand detected by the detector, selection and determination processes for selecting and determining one of selection target items in the operation screen output on the display apparatus, wherein
    the processing device is configured to form, in a vehicle stop state, a first operation screen related to a predetermined function, the first operation screen being operable based on the motion of the hand, and form, in a vehicle travel state, a second operation screen related to the predetermined function, the second operation screen being different from the first operation screen and operable based on the motion of the hand easier than that in the vehicle stop state,
    the first operation screen is such that a pointer or a cursor can be moved to a position corresponding to a direction pointed by a finger,
    the second operation screen is such that functions to be executed can be changed one by one according to an action of the hand as a whole moving in up and down directions or left and right directions, and
    the processing device is configured to perform, in a display state of the first operation screen, the determination process for the selection target item at which the pointer or the cursor is located upon a detection of a determination operation, the determination operation being different from the motion of the hand, and, on the other hand, perform, in a display state of the second operation screen, the determination process for the changed selection target item upon the action of the hand as a whole without detection of the determination operation.

* * * * *